(12) United States Patent
Baret et al.

(10) Patent No.: US 10,775,760 B2
(45) Date of Patent: *Sep. 15, 2020

(54) METHOD AND SYSTEM FOR OPTIMIZING THE COMMISSIONING OF AT LEAST ONE OF A PLURALITY OF AUTOMATION TECHNOLOGY FIELD DEVICES

(71) Applicant: Endress+Hauser Process Solutions AG, Reinach (CH)

(72) Inventors: Marc Baret, Kembs (FR); Georg Hauss, Freiburg (DE); Ulrich Kaiser, Basel (CH); Michael Maneval, Schopfheim (DE); Markus Nick, Kembs (FR)

(73) Assignee: Endress+Hauser Process Solutions AG, Reinach (CH)

( * ) Notice: Subject to any disclaimer, the term of this patent is extended or adjusted under 35 U.S.C. 154(b) by 62 days.

This patent is subject to a terminal disclaimer.

(21) Appl. No.: 15/780,169

(22) PCT Filed: Nov. 11, 2016

(86) PCT No.: PCT/EP2016/077387
§ 371 (c)(1),
(2) Date: May 30, 2018

(87) PCT Pub. No.: WO2017/093000
PCT Pub. Date: Jun. 8, 2017

(65) Prior Publication Data
US 2018/0348725 A1 Dec. 6, 2018

(30) Foreign Application Priority Data

Nov. 30, 2015 (DE) .................. 10 2015 120 731

(51) Int. Cl.
*G05B 13/02* (2006.01)
*G05B 19/042* (2006.01)

(52) U.S. Cl.
CPC .............. *G05B 19/0426* (2013.01); *G05B 2219/21092* (2013.01); *G05B 2219/25428* (2013.01); *G05B 2219/33331* (2013.01)

(58) Field of Classification Search
CPC ................................ B01D 2257/302
(Continued)

(56) References Cited

U.S. PATENT DOCUMENTS 7,953,419 B2 * 5/2011 Jost ................ H04L 12/66
455/456.1
2003/0004765 A1 1/2003 Wiegand
(Continued)

FOREIGN PATENT DOCUMENTS

DE 102005058801 A1 6/2007
DE 102007063312 A1 7/2009
(Continued)

OTHER PUBLICATIONS

Jack et al, English translation of DE102010062661A1, 2010, Google Patents, pp. 3 (Year: 2010).*
(Continued)

*Primary Examiner* — Suresh Suryawanshi
(74) *Attorney, Agent, or Firm* — Kelly J. Smith; Endress+Hauser (USA) Holding Inc.

(57) ABSTRACT

The invention relates to a method and to a system for optimizing the commissioning of at least one of a plurality of field devices in an automation technology system, which are used in different applications, wherein the system comprises at least: one database for saving application information and device types of the plurality of field devices and for saving parameter sets of the plurality of field devices; an electronic computation unit that accesses the remotely arranged database and classifies, assigns, compares, and/or processes the data saved there and has an algorithm for
(Continued)

creating and proposing an optimal parameter set; software for supporting a user during commissioning of one of the plurality of field devices, wherein the electronic computation unit is operated by means of the software.

17 Claims, 1 Drawing Sheet

(58) Field of Classification Search
USPC .......................................................... 700/52
See application file for complete search history.

(56) References Cited

U.S. PATENT DOCUMENTS

| | | | | |
|---|---|---|---|---|
| 2007/0077665 | A1* | 4/2007 | Bump | G05B 19/41845 438/14 |
| 2007/0079250 | A1* | 4/2007 | Bump | G05B 23/0216 715/762 |
| 2011/0022979 | A1* | 1/2011 | Meier | G01D 1/00 715/810 |
| 2011/0270423 | A1* | 11/2011 | Maier | G05B 19/042 700/87 |
| 2014/0067091 | A1* | 3/2014 | Vishwanath | G05B 19/41845 700/83 |
| 2014/0067148 | A1* | 3/2014 | Jachmann | G05B 19/0426 700/295 |
| 2015/0039130 | A1* | 2/2015 | Banerjee | G05B 15/02 700/275 |
| 2015/0066162 | A1* | 3/2015 | Hokeness | G05B 19/0426 700/28 |
| 2015/0105871 | A1* | 4/2015 | Ochsenreither | G05B 19/0426 700/29 |
| 2015/0233790 | A1* | 8/2015 | Ratilla | G05B 19/0426 702/188 |
| 2016/0170825 | A1* | 6/2016 | Nguyen | G06F 11/0751 714/15 |
| 2016/0216706 | A1* | 7/2016 | Christensen | G05B 19/41865 |
| 2016/0259315 | A1* | 9/2016 | Alexander | G05B 19/401 |
| 2016/0291563 | A1* | 10/2016 | Kumar | H04L 41/0883 |
| 2017/0034308 | A1* | 2/2017 | Kande | H04W 4/70 |

FOREIGN PATENT DOCUMENTS

| | | |
|---|---|---|
| DE | 102009000052 A1 | 7/2010 |
| DE | 102010042999 A1 | 5/2012 |
| DE | 102010062661 A1 | 6/2012 |
| DE | 102013218971 A1 | 3/2015 |

OTHER PUBLICATIONS

Search Report for German Patent Application No. 10 2015 120 731.1, German Patent Office, dated Jul. 18, 2016, 8 pp.
Search Report for International Patent Application No. PCT/EP2016/077387, WIPO, dated Jan. 30, 2017, 12 pp.

* cited by examiner

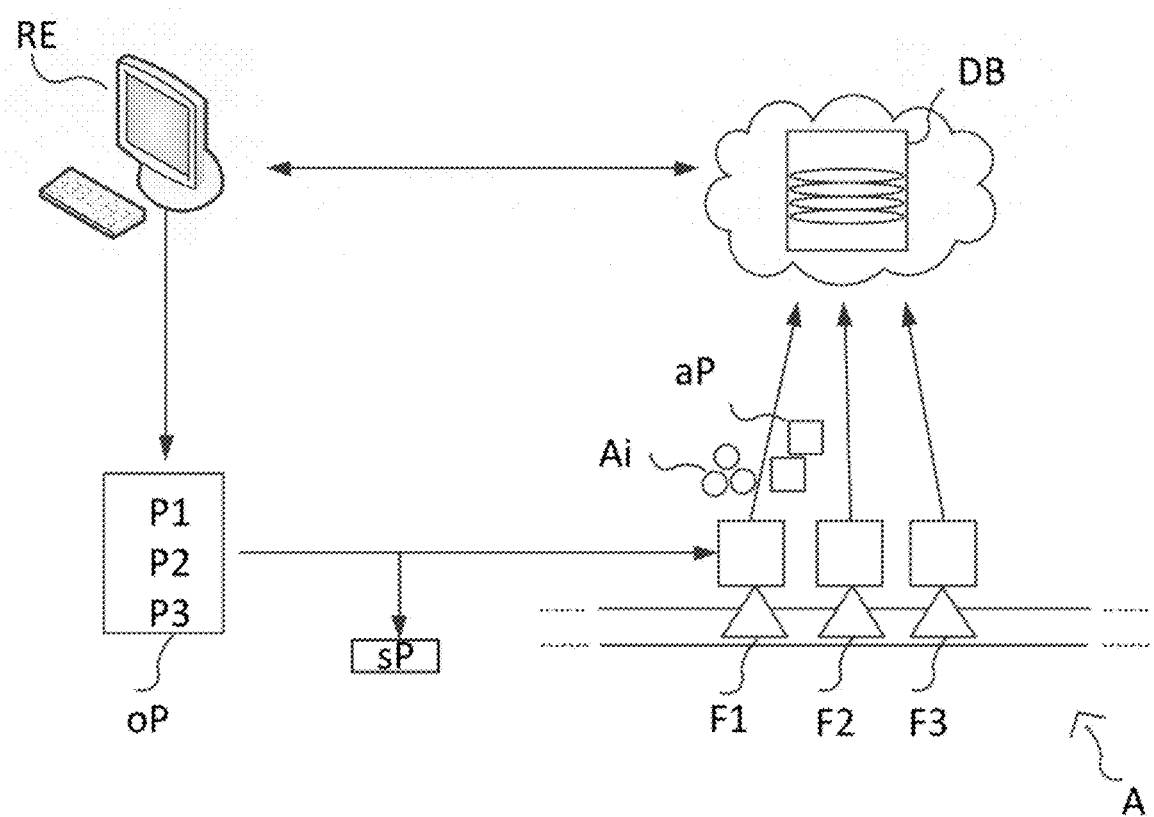

METHOD AND SYSTEM FOR OPTIMIZING THE COMMISSIONING OF AT LEAST ONE OF A PLURALITY OF AUTOMATION TECHNOLOGY FIELD DEVICES

CROSS-REFERENCE TO RELATED APPLICATIONS

The present application is related to and claims the priority benefit of German Patent Application No. 10 2015 120 731.1, filed on Nov. 30, 2015 and International Patent Application No. PCT/EP2016/077387 filed on Nov. 11, 2016, the entire contents of which are incorporated herein by reference.

TECHNICAL FIELD

The invention relates to a method and to a system for optimizing the commissioning of at least one of a plurality of field devices in an automation technology system, which field devices are used in different applications.

BACKGROUND

Field devices that are used in industrial installations are already known from the prior art. In automation technology—in particular, in process automation and in manufacturing automation technology—field devices are used frequently. In principle, the term, "field device," refers to all devices that are process-oriented and that process or supply process-relevant information. Field devices are thus used for detecting and/or influencing process variables. Measuring devices, or sensors, are used for detecting process variables. These measuring devices are used, for example, for pressure and temperature measurement, conductivity measurement, pH measurement, flow measurement, fill-level measurement, etc., and detect the corresponding process variables of pressure, temperature, conductivity, pH value, fill-level, flow, etc. Actuators are used to influence process variables. These actuators are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices are produced and marketed by the Endress+Hauser group.

Field devices that are integrated into a new application of a process system or replacement field devices that replace an obsolete or defective field device of an application must be specifically adapted to the respective application. To this end, these field devices are configured and parameterized during or after manufacturing. The configuration describes, on the one hand, the configuration on the hardware side, e.g., the flange material of a flow measuring device, as well as the configuration on the software side. The term, "parameterization," is understood to mean the defining and specifying of parameters, with the aid of which the operation of the field device is set to the respective features of the application— for example, the measured medium.

From the factory, all field devices of the same device type and/or of the same configuration have the same number of parameters and the same preset standard parameter set. The specific adaptation of individual parameters is extremely complex and associated with a high manual effort as a result of the sometimes high number of parameters—often, up to several hundred different parameters. For the customer, a specific adaptation of the parameters to the respective application is, therefore, frequently not practicable.

Many parameters are, moreover, dependent upon each other, so that a single parameter change by an inexperienced customer can sometimes result in a functional impairment of the field device.

SUMMARY

The invention is thus based upon the aim of providing a method and a system for facilitating the parameterization and/or change in parameter values of a field device for the customer.

The invention is realized by a method for optimizing the commissioning of at least one of a plurality of field devices in an automation technology system, which field devices are used in different applications, the method comprising at least the following steps:
  Collecting application information and device types of the plurality of field devices, wherein the application information describes each of the plurality of field devices unambiguously with respect to its application;
  Classifying the application information of the plurality of field devices and saving the classified application information;
  Collecting parameter sets of each of the plurality of field devices; wherein the parameter sets consist of several parameters, and each parameter is assigned a parameter value or a parameter value range, and each field device has at least one current parameter set; and saving the parameter sets;
  Assigning the current parameter sets of the plurality of field devices to the classified application information and the device types;
  Creating an optimal parameter set from the parameter sets of the same or similar device types for the same or similar applications by means of an algorithm;
  Proposing the optimal parameter set for at least one of the plurality of field devices, based upon its application;
  Replacing the current parameter set of the field device by the optimal parameter set for the application of the field device in case the proposal is completely or partly accepted, and storing the optimal parameter set in a database.

The method according to the invention allows for simplified commissioning of a field device. As a result of the application information of a large number of field devices being determined and assigned to the determined current parameter sets, the parameter sets of the field devices can be optimized for the respective application.

Depending upon the algorithm used, the field device is, for example, parameterized with the parameters that were used most frequently for the respective application in prior applications.

The method according to the invention moreover constitutes a large store of experience for manufacturing future new field devices more easily and in an optimized manner, e.g., for programming the drivers ("device type managers," or DTM's) of future field devices in an optimized manner.

Field devices that are described in connection with the invention are described by way of example in the introductory part of the present application.

The term, "application," refers to an application within the system or within a process point of the system, such as a flow measurement of a medium.

An advantageous embodiment of the method according to the invention provides that only a base parameter be displayed in the proposal in case the parameters contained in the current parameter sets are dependent upon each other. This decreases the number of parameters visible to the user.

In a development of the method according to the invention, an application-specific standard parameter set is created from the optimal parameter set. As a result, it is possible to already offer field devices for a specific application from the factory. The commissioning is thereby significantly simplified for the customer, and the duration of the commissioning is further reduced.

In an embodiment of the method according to the invention, the standard parameter set is manually optimized.

A preferred embodiment of the method according to the invention provides that, for later use, comments regarding individual parameters of the standard parameter set be created and saved as part of the proposal. This simplifies the decision of the customer for or against the proposal.

A preferred variant of the method according to the invention provides that the optimal parameter set be separated into static parameters, the previously most frequently used parameter values of which do not change over time, and dynamic parameters. Dynamic parameters contain non-modeled process characteristics, which are entered manually by the customer, such as the tank size of a tank filled with medium.

A particularly advantageous development of the method according to the invention provides that the field device be parameterized with the optimal parameter set for the respective application, in the case where no dynamic parameters are available.

In an advantageous development of the system according to the invention, during parameterization of the field device, the user is supported by the software in adapting the optimal parameter set with respect to the dynamic parameters.

In a particularly advantageous embodiment of the system according to the invention, during parameterization of the field device, the user is supported by a wizard implemented in the software in adapting the optimal parameter set with respect to the dynamic parameters. This embodiment of the method according to the invention can thus be easily carried out by the customer, since the customer is guided by the wizard in each of the method steps.

In a particularly preferred development of the system according to the invention, during parameterization of the field device, the user is supported by a wizard implemented in a device DTM of the field device in adapting with respect to the dynamic parameters. This development of the method according to the invention can thus be easily carried out by the customer, since the customer is guided by the wizard in each of the method steps. A DTM ("device type manager") is a driver that, analogously to, for example, a printer driver, constitutes a device-specific software component that processes data for the device.

A preferred development of the system according to the invention provides that a degree of validity of each of the optimal parameter sets be created, wherein the degree of validity contains information about the frequency of the respective successful application and/or the respective successful re-use of the optimal parameter sets.

In an advantageous embodiment of the method according to the invention, a parameterization history of the plurality of field devices is created using software. In this way, for the customers, an overview of previous parameterizations is provided at any time. Moreover, this embodiment further optimizes the method according to the invention with respect to time.

The invention is, moreover, realized by a system for optimizing the operation of a plurality of automation technology field devices, which system is suitable for implementing the method according to the invention and at least comprises:
  a database for saving application information and device types of a plurality of field devices and for saving parameter sets of the plurality of field devices;
  an electronic computation unit that accesses the remotely-arranged database and classifies, assigns, compares, and/or processes the data saved there;
  software for supporting a user in parameterizing one of the plurality of field devices.

An advantageous embodiment of the system according to the invention provides that the application information consist of configuration, measuring method, and/or measuring task data of a field device. Generally speaking, application information constitutes information that sufficiently describes a field device with respect to its application.

In a particularly advantageous variant of the system according to the invention, the remotely-arranged database and/or the computation unit can be reached by means of cloud-computing web services. Cloud computing in this case describes the saving of data in a remote computing center—in this case, in a remote database. The advantage consists in a centralization of the stored data taking place, since each field device saves its data in the form of device types and diagnostic messages in this database.

An advantageous development of the system according to the invention provides that tracking of the parameter history of the plurality of field devices over time be implemented in the software.

A particularly preferred embodiment of the system according to the invention provides that the software be implemented on the computation unit, on a computer of the user, and/or on each of the plurality of field devices. The software accesses the database via one or more networks to which the computation unit, the computer of the user, and/or each of the plurality of field devices is connected. In principle, any customary protocol of a WAN or LAN network can be used for this purpose. However, an automation technology fieldbus network, such as Foundation Fieldbus®, Profibus®, HART®, Modbus®, etc., can also be used, which is, for example, connected to the internet via a gateway. The software can also be located as application software on a mobile end device, such as a smartphone or a tablet.

BRIEF DESCRIPTION OF THE DRAWING

The invention is explained in greater detail with reference to the following figure. Illustrated is:

FIG. 1 shows an embodiment of the method according to the invention for operating at least one of a plurality of field devices in an automation technology system.

FIG. 1 shows an embodiment of the method according to the invention for operating at least one of a plurality of field devices F1, F2, F3 in an automation technology system A.

DETAILED DESCRIPTION

The field devices F1, F2, F3 are located in the same system A and are used in the same application or in applications differing from each other. For example, field device F1 and field device F3 are, in this case, flow meters in accordance with the ultrasonic principle, and field device F2 is, in this case, a temperature sensor.

Application information Ai and the respective device type are collected from each of the field devices F1, F2, F3. The application information Ai consists, in particular, of configuration, measuring method, and/or measuring task data of a field device, such as the type of medium, or the flange size of a measuring tube in the case of a flow measuring device. Generally speaking, application information Ai constitutes information that sufficiently describes a field device F1, F2, F3 with respect to its application. The application information Ai is sent directly by the respective field device F1, F2, F3 to a database DB, and saved there by the database DB. Alternatively, part of the application information Ai or even all of the application information Ai can also be entered manually into the database DB, e.g., by a technician who commissions a field device F1, F2, F3 on-site. Another alternative is for software, e.g., parameterization software, to read the application data Ai of the field devices F1, F2, F3 and send them to the database DB.

The remotely-arranged database DB is a database DB that can be reached by means of cloud-computing web services. Cloud computing in this case describes the saving of data in a remote computing center—in this case, in a remote database DB. The advantage consists in a centralization of the stored data taking place, since each field device F1, F2, F3 saves its data in the form of application information Ai in this database.

The application information Ai is sent to the database DB via one or more networks to which each of the plurality of field devices is connected. In principle, any customary protocol of a WAN or LAN network can be used for this purpose. However, an automation technology fieldbus network, such as Foundation Fieldbus®, Profibus®, HART®, Modbus®, etc., can also be used, which is, for example, connected to the internet via a gateway.

The application information Ai saved in the database DB is subsequently classified by the computation unit RE. A user can access the computation unit RE via cloud computing, in the same way as the database DB. The access takes place, for example, by means of an internet-enabled computer or a mobile end device, such as a tablet PC or a smartphone.

Alternatively, the internet-enabled computer of the user, or his mobile end device, can assume the role of the computation unit RE, access the database DB, and assume tasks assigned to the computation unit RE.

Subsequently, parameter sets aP are collected by the field devices F1, F2, F3. In this case, these parameter sets aP, sP of the respective field devices F1, F2, F3 can also be sent to the database DB by the field devices themselves, or be entered manually into the database DB. As another alternative, in this step as well, software, e.g., parameterization software, can read the parameter sets aP, sP of the field devices F1, F2, F3 and send them to the database DB. Parameter sets aP contain at least one parameter P1, P2, P3, and a parameter value or a parameter value range is assigned to each parameter P1, P2, P3. The parameter sets aP are current parameter sets aP, with which the respective field device F1, F2, F3 is operated. The computation unit RE assigns the parameter sets aP to the respective application information Ai saved in the database DB and saves them in the database DB.

The field devices F1, F2, F3 sometimes have a very large number of different parameters P1, P2, P3. In practice, sometimes, only a fraction of the parameters P1, P2, P3 is needed by a customer in an application.

In order to determine an optimal parameter set oP with application-specific optimal parameter values, all parameter values of all field devices F1, F2, F3 of an application are compared. The optimal parameter values are determined by means of an algorithm implemented in the computation unit RE. For example, these can be those saved parameter values that occur most often for the respective parameter P1, P2, P3. Other selection mechanisms can also be saved in the algorithm, e.g., the determination of an average value or a median value across all saved parameter values of a respective parameter P1, P2, P3.

A proposal for the optimal parameter set oP is subsequently displayed to the customer. In the case where parameters P1, P2, P3 contained in the current parameter sets aP are dependent upon each other, only a base parameter is displayed in the proposal to the customer. If the customer accepts this proposal, the current parameter set aP is replaced by the optimal parameter set oP. In this way, the customer is relieved of the manual parameterization, and the field device F1, F2, F3 is optimally parameterized for the respective application.

Lastly, the optimal parameter set oP is also saved in the database DB, in order to optimize the method successively.

A degree of validity can be determined for each optimal parameter set oP. A degree of validity contains information regarding the frequency of the respective successful application and/or the respective successful re-use of the respective optimal parameter set oP. If, for example, the evaluation of the most frequent parameter values leads to several results, the different options are displayed together with the respective degree of validity. The customer can thus make an informed decision for the parameter values P1', P2' of the optimal parameter set oP, on the basis of the degree of validity. The higher the degree of validity is, the sooner the respective optimal parameter set oP is suitable for the respective application.

If an optimal parameter set oP has a very high degree of validity, an application-specific standard parameter set sP can be created from this optimal parameter set oP. This standard parameter set sP can already be implemented at the factory in the field devices F1, F2, F3 of the same application.

The parameterization of the field device F1, F2, F3 takes place via software. The software, moreover, creates a parameterization history. In this respect, the software can be located on the computation unit RE, on a device of the customer, such as a computer or a mobile end device, such as a tablet or smartphone, or directly on each of the plurality of field devices F1, F2, F3.

If the optimal parameter set oP contains dynamic parameters, the values of these parameters must be entered manually by the customer. In this case, the software facilitates the input for the customer—for example, by means of a wizard implemented in the software. The customer then must, for example, set only one base parameter from a multitude of dependent dynamic parameters. This base parameter can, however, also be located directly in the device driver—for example, a DTM ("device type manager").

It goes without saying that the method can be applied to any type and number of field devices F1, F2, F3 and is not limited to the examples of field devices F1, F2, F3 and their parameters P1, P2, P3 used in this embodiment.

The invention claimed is:

1. A method for optimizing a commissioning of at least one of a plurality of field devices in an automation technology system, comprising:
   collecting application information and device types of the plurality of field devices, wherein the application information describes each of the plurality of field devices with respect to its application;

saving the application information and the device type in a database;

collecting parameter sets from the plurality of field devices and saving the parameter sets in the database, wherein the parameter sets include several parameters, each parameter having a parameter value or a parameter value range, and wherein each of the plurality of field devices has at least one parameter set;

associating the parameter sets of the plurality of field devices to the application information and to the device types;

creating an optimal parameter set from the parameter sets of the same or similar device types for the same or similar applications using an algorithm, wherein the algorithm includes a step of creating the optimal parameter set by comparing all parameter values of all field devices of the same or similar applications;

proposing the optimal parameter set for the at least one of the plurality of field devices, based upon the application of the at least one field device;

when the proposal is completely accepted or partly accepted, replacing the parameter set of the at least one field device with the optimal parameter set for the application of the at least one field device and storing the optimal parameter set in a database.

2. The method according to claim 1, wherein when parameters contained in the parameter sets are dependent upon each other, only a base parameter is displayed in the proposal.

3. The method according to claim 1, further comprising: creating an application-specific standard parameter set from the optimal parameter set.

4. The method according to claim 3, further comprising: manually optimizing the application-specific standard parameter set.

5. The method according to claim 4, wherein, for later use, comments regarding the individual parameters of the application-specific standard parameter set are created and saved as part of the proposal.

6. The method according to claim 1, further comprising: separating the optimal parameter set into static parameters that do not change over time and into dynamic parameters.

7. The method according to claim 6, wherein the at least one field device is parameterized with the optimal parameter set for the respective application when no dynamic parameters are available.

8. The method according to claim 6, wherein during commissioning of the at least one field device, the user is supported by software in adapting the optimal parameter set with respect to the dynamic parameters.

9. The method according to claim 6, wherein during commissioning of the at least one field device, the user is supported by a wizard implemented in software in adapting the optimal parameter set with respect to the dynamic parameters.

10. The method according to claim 6, wherein during commissioning of the at least one field device, the user is supported by a wizard implemented in a device type manager of the at least one field device in adapting the optimal parameter set with respect to the dynamic parameters.

11. The method according to claim 1, further comprising: creating a degree of validity for the optimal parameter set, wherein the degree of validity includes information about the frequency of a respective successful application and/or a respective successful re-use of the optimal parameter set.

12. The method according to claim 1, further comprising: creating a parameterization history of the plurality of field devices using software.

13. A system for optimizing a commissioning of at least one of a plurality of field devices in an automation technology system, comprising:

a database having a data structure configured to save application information of the field device, wherein the application information includes a measuring method and a measuring task of the field device, device types of the plurality of field devices and parameter sets of the plurality of field devices, wherein the parameter sets each include a parameter identifier and a parameter value for each parameter of the parameter sets, wherein the database is remotely arranged from the plurality of field devices;

a network, wherein the database is connected with the network;

an electronic computation unit connected with the network and connected with the database via the network, wherein the electronic computation unit is configured to execute parameterization software; and parameterization software, wherein the parameterization software is executed by the electronic computation unit, and wherein the parameterization software is configured to:

read application information from each field device and store the application information in the database, wherein the application information includes a measuring method and a measuring task of the field device;

read the device type from each field device and store the device type in the database;

read the parameter set from each field device and store the parameter set in the database, wherein the parameter set is associated with the application information of the field device and the device type of the field device;

compare all parameter values of all field devices of the same or similar application to create an optimal parameter set from the parameter sets of the same or similar device types for the same or similar applications; and store the optimal parameter set on the field device.

14. The system according to claim 13, wherein the application information of a field device includes the field device's configuration, measuring method, and/or measuring task data.

15. The system according to claim 13, wherein the remotely-arranged database and/or the computation unit can be reached via cloud-computing web services.

16. The system according to claim 13, wherein the software is further configured to track a parameter history of the plurality of field devices over time.

17. The system according to claim 13, wherein the software is implemented on the computation unit, on a computer of the user, and/or on each of the plurality of field devices.

* * * * *